United States Patent
Hamerski et al.

[11] Patent Number: 6,120,867
[45] Date of Patent: Sep. 19, 2000

[54] REMOVABLE TAPE LAMINATE

[75] Inventors: Michael D. Hamerski, Township of Baldwin; Robert H. Heil, New Richmond, both of Wis.

[73] Assignee: 3M Innovative Properties Company, St. Paul, Minn.

[21] Appl. No.: 09/014,058

[22] Filed: Jan. 27, 1998

[51] Int. Cl.$^7$ ........................................................ C09J 7/02
[52] U.S. Cl. ...................... 428/40.1; 428/41.8; 428/41.9; 428/42.1; 428/43; 428/121; 428/194; 428/317.1; 428/354
[58] Field of Search .................................. 428/40.1, 41.8, 428/41.9, 42.1, 43, 121, 194, 354, 317.1

[56] References Cited

U.S. PATENT DOCUMENTS

| | | | |
|---|---|---|---|
| 3,691,140 | 9/1972 | Silver | 260/78.5 |
| 4,024,312 | 5/1977 | Korpman | 428/343 |
| 4,310,137 | 1/1982 | Frye | 248/467 |
| 5,409,189 | 4/1995 | Luhmann | 248/205.3 |
| 5,507,464 | 4/1996 | Hamerski et al. | 248/683 |
| 5,516,581 | 5/1996 | Kreckel et al. | 428/317.3 |

FOREIGN PATENT DOCUMENTS

| | | |
|---|---|---|
| 43 39 604 | 5/1995 | Germany . |
| WO 98/21285 | 5/1998 | WIPO . |

OTHER PUBLICATIONS

U.S. Patent Application No. 08/308,937.
U.S. Patent Application No. 08/746,351.
International Search Report for PCT/US98/12546.

*Primary Examiner*—Nasser Ahmad
*Attorney, Agent, or Firm*—William L. Huebsch

[57] ABSTRACT

A tape laminate comprising a support layer having first and second parts, and an anchor portion of one of its opposite major surfaces on each of the parts. The first and second parts of the support layer are disposed with the anchor portions on opposite sides of the support layer and in generally parallel relationship. The anchor portions can be bonded to the opposed surfaces of rigid objects so that the tape laminate supports one object from the other against a static force generally parallel to the anchor portions. One of those bonds is made by an attachment strip having a portion of its outer major surface defined by pressure sensitive adhesive and its inner major surface bonded to one of the anchor portions, and a manually engageable tab portion at one end. The attachment strip is stretchable by pulling its tab portion to release adhesive engagement of its outer major surface from an object to which it is adhered. The first and second parts of the support layer can be torn apart or pivoted away from each other to afford separation of rigid objects to which the anchor portions are bonded, thereby affording access to that tab portion and separation of the attachment strip from one of the rigid objects by stretching the attachment strip.

29 Claims, 10 Drawing Sheets

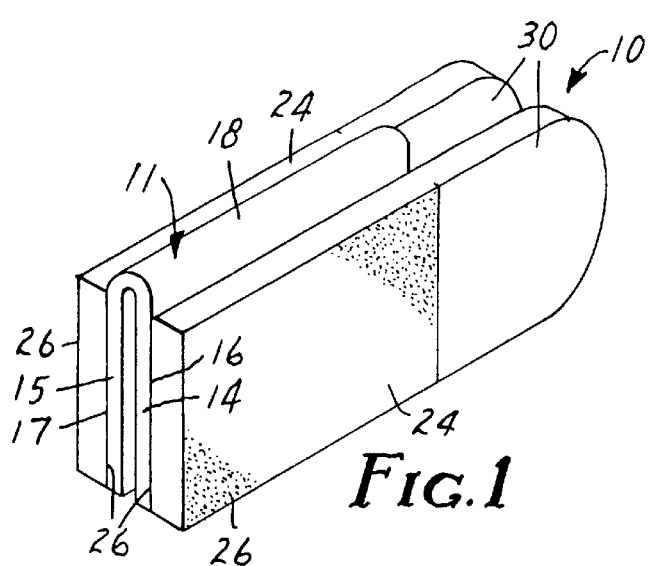
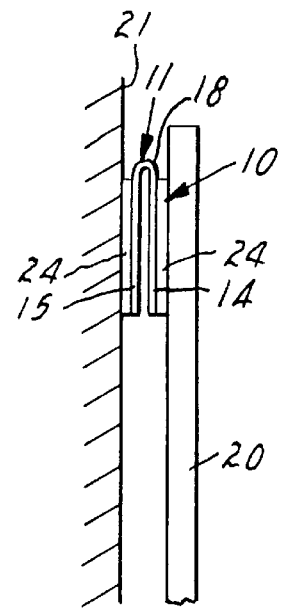
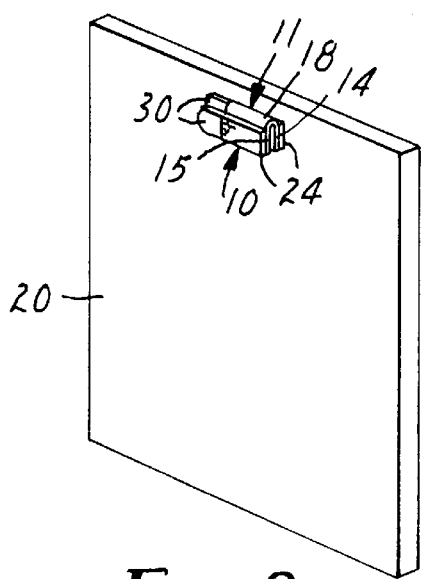
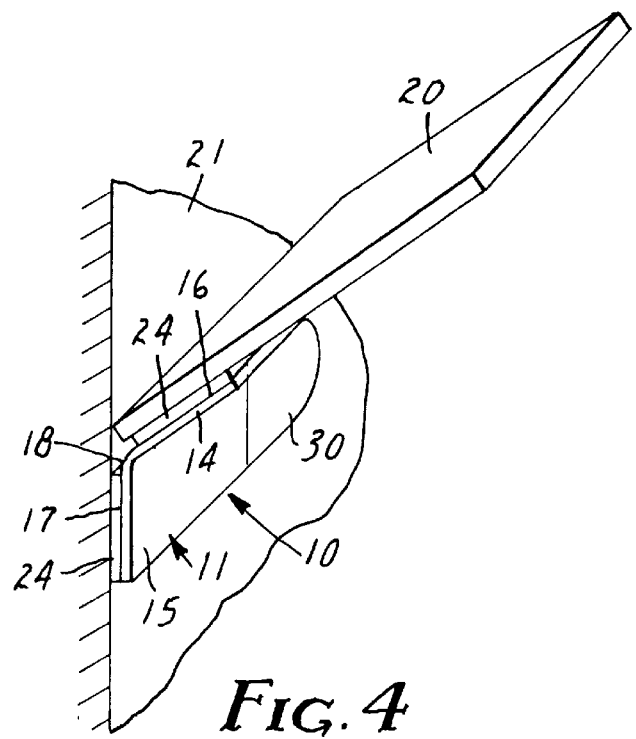
Fig. 1
Fig. 3
Fig. 2
Fig. 4

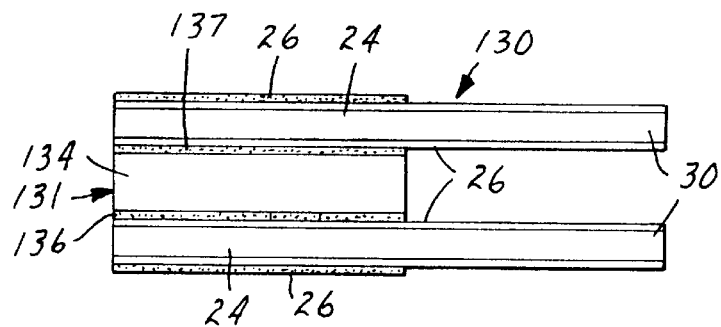
FIG.18
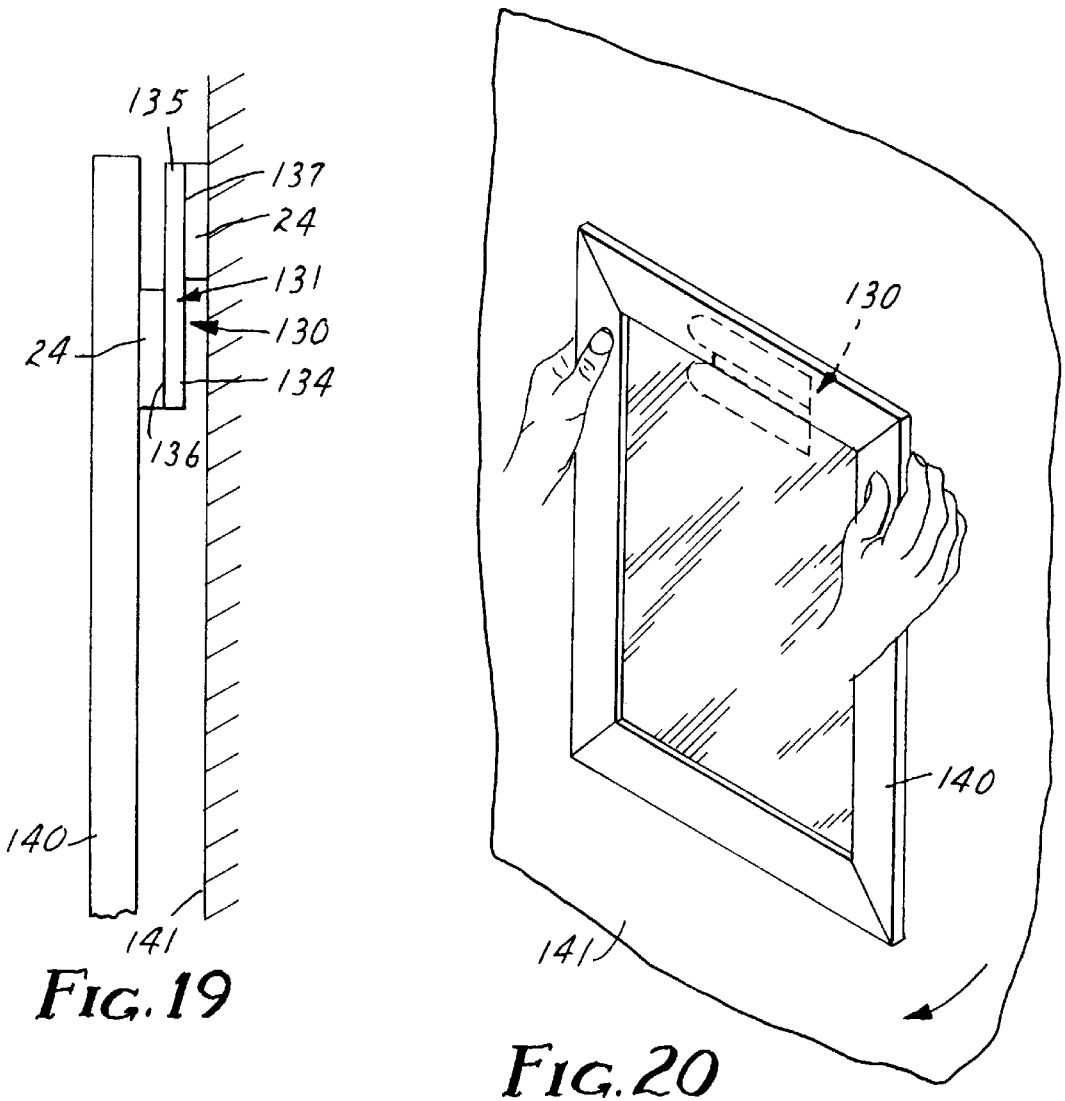
FIG.19
FIG.20

6,120,867

REMOVABLE TAPE LAMINATE

FIELD OF THE INVENTION

The present invention relates to structures by which the opposed surfaces of objects may be removably adhered together.

BACKGROUND OF THE INVENTION

Laminated tape structures including a central layer of polymeric film or foam with layers of adhesive on its opposite major surfaces (e.g., the tape structures sold under the trade designations "Wallsaver Removable poster tape", "3M Automotive attachment Tape", or "3M Acrylic Foam Tape" by Minnesota Mining and Manufacturing Company, St. Paul, Minn.) have been used to bond the opposed surfaces of two objects together, such as to bond a wall hanging such as a poster, plaque, or a picture to a wall. When such a tape structure in which the adhesive is a high tack pressure sensitive adhesive (e.g., the "3M Acrylic Foam Tape" mentioned above) is used for that purpose, it is often difficult to later separate the objects. The tape structure is positioned in a very narrow area between the objects where it is not readily accessible, particularly when the tape structure is between a rigid wall hanging and a wall. Typically, an attempt is made to either slice the tape structure in half between its outer surfaces with a knife or similar implement poked between the objects, or one object (e.g., a wall hanging) is twisted on or pulled from the other object (e.g., a wall), often resulting in damage to one or both of the objects.

Laminated structures are described in U.S. Pat. No. 4,310,137 (Frye) that include outer attachment layers having opposite major surfaces defined by pressure sensitive adhesive that can be adhered to the opposed surfaces of closely spaced objects so that the laminated structures support one object from the other, and a separable layer of non-fusible porous material such as tissue paper between the outer attachment layers that can be separated by an outward exertion on one of the outer attachment layers away from the other.

Attachment strips having opposite major surfaces at least partially defined by pressure sensitive adhesive have been developed that can be used to bond objects together, and can subsequently be stretched by pulling on tab portions at ends of the attachment strips to cleanly separate the adhesive bonds between the attachment strips and the objects they had previously joined (e.g., see U.S. Pat. Nos. 5,409,189 (Luhmann) and 5,516,581 (Kreckel et al), and U.S. patent application Ser. No. 08/308,937 (Bries et al)). While such stretch releasable attachment strips work well, the tab portion at the end of such a attachment strip joining two or more objects should be positioned where it can be engaged by a person who later wishes to separate the objects. One of the objects can be specially made with a removable portion that covers that tab portion (see U.S. Pat. No. 5,507,464, Hamerski et al), or, if one of the objects is flexible, that flexible object may be bent to afford access to that tab portion. In many instances where rigid objects are joined, however, it may be necessary to allow the tab portion to project from between the joined objects to afford such engagement with that tab portion to remove the stretchable attachment strip from between the objects. Such a projecting tab portion can be aesthetically objectionable.

German Patent Publication DE 43 39 604 dated May 24, 1995, describes a tape structure that can be used to bond together the opposed surfaces of objects including rigid objects with no portion of the tape structure projecting from between the objects, and which subsequently affords separation of the objects by moving one of the objects relative to the other. That tape structure is described as an adhesive tape for separable adhesive joints made from a double-sided adhesive tape which has adhesive areas on opposing sides at an offset which are not adherent, whereby the non adherent areas do not, or only slightly overlap, and which allow the adhesive joint made with them to be separated by pulling apart the non-adhesive areas, particularly by pulling in the direction of the adhesive plane.

U.S. patent application Ser. No. 08/746,351 filed Nov. 8, 1996, discloses a tape structure that can be used to bond together the opposed surfaces of objects including rigid objects (e.g., bond a plaque or framed picture to a wall) with no portion of the tape structure projecting from between the objects, and which subsequently affords easy separation of the objects without damage to either of them. That tape structure comprises an internally separable layer having opposite major anchor surfaces. The anchor surfaces are adapted to be bonded to the opposed surfaces of objects (e.g., by layers of pressure sensitive or other types of adhesive on the anchor surfaces or by other means such as heat fusion or the use of stretch releasable attachment strips as is described below). The internally separable layer has an internal static shear strength in a direction parallel to its anchor surfaces that is adapted to support one of the objects to which it is attached from the other with its anchor surfaces vertically disposed (e.g., preferably has a static shear strength parallel to its anchor surfaces that is about equal to or exceeds the maximum static shear strength that pressure sensitive adhesive will develop with normal surfaces to which it can be adhered), and has an internal dynamic tensile strength in a direction generally normal to its anchor surfaces that will afford internal separation of the separable layer by pulling apart the objects it has joined without damaging the surfaces of those objects. In an embodiment of that laminate adapted to be easily and cleanly removed from one or both of the objects it attaches together, the laminate comprises one or two stretch releasable attachment strips each having an outer surface defined by pressure sensitive adhesive that can be adhered to an object and being stretchable by being manually pulled at an end tab portion to release adhesive engagement of its outer surface to an object to which it has been adhered.

DISCLOSURE OF THE INVENTION

The present invention also provides structures that can be used to bond together the opposed surfaces of objects including rigid objects (e.g., to bond plaques or framed pictures to walls) with no portion of the tape structures projecting from between the objects, and which subsequently afford easy separation of those objects without damage to either of them.

According to the present invention there is provided a tape laminate comprising a support layer having opposite major surfaces, first and second parts, and an anchor portion of one of its major surfaces on each of those parts. The first and second parts of the support layer are disposed with the anchor portions on opposite sides of the support layer and in generally parallel relationship. Means are provided for bonding the anchor portions to the opposed surfaces of rigid objects so that the tape laminate can support one object from the other against a static force generally parallel to the anchor portions. That means for bonding comprises a first attachment strip having inner and outer opposite major surfaces extending between its ends and comprising a first layer of adhesive defining at least a portion of its outer major surface with its inner major surface being bonded to the anchor portion on the first part. Means including a tab portion are provided for affording stretching of the first attaching strip by manually pulling on the tab portion to release adhesive engagement of the first layer of adhesive from an object to which the outer major surface of said first layer of adhesive is adhered. Also, separating means are provided for affording separation of the first and second parts of the support layer and thereby sufficient separation of rigid objects to which the anchor portions are bonded by the means for bonding with said tab portion therebetween to afford access to the tab portion and release of adhesive engagement of the first layer of adhesive from one of the rigid objects by manually stretching the attachment strip.

In one embodiment of that tape laminate, the anchor portions are both portions of the same major surface of the support layer, and the support layer is folded between its first and second parts to position the anchor portions on opposite sides of the support layer. The fold in the support layer affords pivotal movement of the first and second parts away from each other to provide the means for affording separation of the first and second parts of the support layer. Additionally, when the support layer is made from a material that can be torn, it can be torn along the fold to provide alternative means for affording separation of the first and second parts of the support layer. Thus, the tape laminate can be used, for example, to hang a picture on a wall. One of the anchor portions is attached (i.e., attached with permanent adhesive, mechanical fasteners, a stretch release attachment strip or otherwise) to the rear surface of the picture with the fold along the top edge of the picture. The other attachment portion is adhered to the wall by the stretch release attachment strip. The picture overlays all of the tape laminate so that it is not visible while it supports the picture on the wall. When removal of the picture from the wall is desired, the bottom edge of the picture is swung away from the wall. The tape laminate serves as a hinge and the parts of the tape laminate separate around the fold in the support layer. The person removing the picture can then grab the now exposed tab on the attachment strip and stretch it to remove the picture and tape laminate from the wall. This attachment and removal is done without any damage or marking of the wall or damage to the picture.

In an alternative embodiment of the tape laminate, each of the anchor portions is a portion of a different one of the opposite major surfaces of the support layer, and the support layer is generally planar to thereby position the anchor portions on opposite sides of the support layer. The support layer is adapted (e.g., perforated or scored) to be manually torn between the parts to provide the means for affording separation of the first and second parts of the support layer.

According to the present invention there may also be provided an object (e.g., a picture or a disposable container of items such as scrubbing pads or canned goods) adapted to be releasably adhered to a vertical surface, which object includes a support layer having opposite major surfaces, first and second parts, and an anchor portion of one of the major surfaces on the second part. The first part is attached to or incorporated in the object, and the second part of the support layer is disposed with the anchor portion generally parallel to the portions of the major surfaces on the first part. An attachment strip of the type described above has its inner major surface bonded to the anchor portion, and the attachment strip includes separating means for affording separation of the first and second parts of the support layer to afford sufficient separation of the objects from a surface to which the object is bonded by the attachment strip with the tab portion therebetween to afford access to the tab portion and thereby separation of the attachment strip from that surface by stretching the attachment strip.

In one embodiment the parts of support layer are coplanar, the support layer is perforated to define sides of the second part that can be separated from the first part while one side of the second part is joined to the first part. The support layer is adapted to be broken along the perforations and then either folded between the parts to cause pivotal movement of the first and second parts away from each other to provide the means for affording separation of the first and second parts of the support layer; or manually torn between the parts to provide that means. Thus the rear wall of a pasteboard container of disposable products can be the support layer and can be perforated to provide the first and second parts. The container can be adhered to a wall in a kitchen or workshop using the attachment strip which is concealed by the container. When the container is empty, it can easily be removed by breaking the perforations and either bending or tearing its rear wall between the first and second parts to gain access to the tab on the attachment strip, after which that attachment strip can be stretched to remove the container from the wall, leaving the wall unmarked from having supported the container.

In another embodiment the support layer (which can be the rear wall of the container) is folded between its first and second parts to position the anchor portion facing away from the rear surface of the object. The fold in the support layer affords pivotal movement of the first and second parts away from each other to provide the means for affording separation of the first and second parts of the support layer. Additionally, when the support layer is made from a material that can be torn it can be torn along the fold to provide alternative means for affording separation of the first and second parts of the support layer.

BRIEF DESCRIPTION OF THE DRAWING

The present invention will be further described with reference to the accompanying drawing wherein like reference numerals refer to like parts in the several views, and wherein:

FIG. 1 is a perspective view of a first embodiment of a tape laminate according to the present invention;

FIG. 2 is a perspective view of the tape laminate of FIG. 1 adhered to the rear surface of a wall hanging;

FIG. 3 is a side view of the tape laminate of FIG. 1 adhering the wall hanging of FIG. 2 to the surface of a wall;

FIG. 4 is a perspective view illustrating lifting of the wall hanging of FIG. 2 adhered to the wall as in FIG. 3 in order to separate parts of the tape laminate of FIG. 1 so that it can be removed from the wall and/or wall hanging;

FIG. 8b is an end view of a modification of the fourth embodiment of a tape laminate according to the present invention illustrated in FIG. 8a;

FIG. 18 is an end view of the tape laminate of FIG. 17;

FIG. 19 is a side view illustrating the tape laminate of FIGS. 17 and 18 attaching a wall hanging to a wall;

FIG. 20 is a perspective view of the tape laminate, wall hanging and wall of FIG. 19 that illustrates removing the wall hanging from the wall by separating parts of the tape laminate;

DETAILED DESCRIPTION

Figure 5:
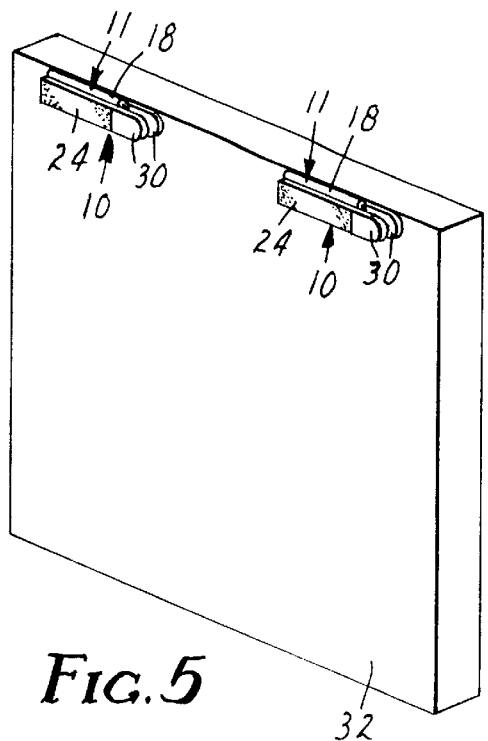
FIG. 5 is a perspective view of two of the tape laminates of FIG. 1 adhered to the rear surface of a wall hanging.

Referring now to FIGS. 1, 2, 3, and 4 of the drawing, there is illustrated a first embodiment of a tape laminate according to the present invention generally designated by the reference numeral 10.

Generally, the tape laminate 10 comprises a support layer 11 having opposite major surfaces, first and second parts 14 and 15 adjacent its opposite ends, and an anchor portion 16 or 17 of the same one of its major surfaces on each of its parts 14 and 15. The support layer 11 has a fold 18 so that the first and second parts 14 and 15 of the support layer 11 are disposed with the anchor portions 16 and 17 on opposite sides of the support layer 11 and in generally parallel relationship. Means are provided for bonding the anchor portions 16 or 17 to the opposed surfaces of rigid objects such as a wall hanging 20 and a wall 21 as illustrated in FIGS. 2 through 4 so that the tape laminate 10 can support one object from the other (e.g., the wall hanging 20 from the wall 21 as illustrated in FIG. 3) against a static force generally parallel to the anchor portions 16 and 17. As illustrated, that means for bonding comprises two attachment strips 24 each having inner and outer opposite major surfaces 26 extending between its ends with portions of its outer and inner major surfaces 26 being defined by pressure sensitive adhesive and its inner major surface being bonded to one of the anchor portions 16 or 17, and each having a manually engageable tab portion 30 at one end. The attachment strips 24 are stretchable by being pulled at their tab portions 30 to release adhesive engagement of their outer and inner major surfaces 26 from the objects or wall hanging 20 and wall 21 to which their outer major surfaces 26 are adhered and from the anchor portions 16 and 17 of the support layer 11 to which they were adhered. The tape laminate 10 includes separating means for affording separation of the first and second parts 14 and 15 of the support layer 11 to afford sufficient separation of rigid objects (e.g., the wall hanging 20 and wall 21) to which the anchor portions 16 and 17 are bonded by the attachment strips 24 with the tab portions 30 therebetween to afford access to the tab portions 30 and thereby separation of at least one of the attachment strips 24 from one of the rigid objects (e.g., the wall 21) by stretching that attachment strip 24. That means is provided by the fold 18 between the first and second parts 14 and 15 of the support layer 11. The fold 18 affords pivotal movement of the first and second parts 14 and 15 away from each other as illustrated in FIG. 4 to provide such access to the tab portions 30 of the attachment strips 24 so that at least one of the attachment strips 24 can be stretched to remove it from the object to which it was adhered (e.g., the attachment strip 24 adhered to the wall 21 can be removed so that the wall hanging 20 can be taken down).

As illustrated in FIG. 5, if a wall hanging 32 is too large or heavy to be supported by a single tape laminate 10, more than one tape laminate 10 (two as illustrated) can be used with their folds 18 aligned to support the wall hanging 32 from a wall.

Preferably, the attachment strips 24 used in the tape laminate 10 are those described in U.S. patent application Ser. No. 08/308,937 (Bries et al) filed Sep. 20, 1994, or the corresponding International Published Application WO 95/06691, the contents whereof are incorporated herein by reference. Generally those attachment strips 24 comprise a central layer of polymeric foam (e.g., polyolefin foam), two layers of stretchable polymeric film (e.g., polyethylene or polypropylene film, with linear low density and ultra linear low density polyethylene film being preferred) bonded along opposite major surfaces of the layer of foam, and two layers of adhesive that define the major adhesive surfaces and are adhered along major surfaces of the layers of film opposite those bonded along the layer of foam. The attachment strips 24 are preferably about three quarter inch (1.9 centimeter) wide, as a wider attachment strip may be too difficult to stretch to cause release of the layers of adhesive. The layers of adhesive on the attachment strips 24 can be made as long as necessary to provide the desired amount of holding force on a substrate.

Alternatively, the attachment strips 24 could consist of two layers of adhesive that define the major adhesive surfaces adhered along opposite major surfaces of a single layer of stretchable polymeric film, or could be the attachment strips 40 described in U.S. Pat. No. 5,409,189 (Luhmann), the content whereof is incorporated herein by reference, which attachment strips 40 each include a single layer 41 of pressure sensitive adhesive that would define the two major adhesive surfaces, and each have polymeric film coverings 42 over their projecting tab end portions to keep them from adhering together and to provide non-sticky surfaces for their tab end portions by which the layers 41 of pressure sensitive adhesive can be stretched to cause them to release from surfaces between which they have been adhered.

The support layer 11 should be strong, easily bent, and essentially non stretchable. Materials from which the support layer 11 can be made include paperboard or paper (e.g., the 0.015 inch (0.04 centimeter) thick paper material available as "Tab Inserts, Stock No. C15H" from Smead Co., Hastings, Minn.), or polymeric materials including, but not limited to, thin layers of polyolefins such as polyethylene or polypropylene, or thin layers of metal such as aluminum foils.

If the support layer is made from a material that can be manually torn such as paper, the support layer 11 can be torn along the fold 18 to provide alternative means for affording separation of the first and second parts of the support layer 11.

Figure 6:
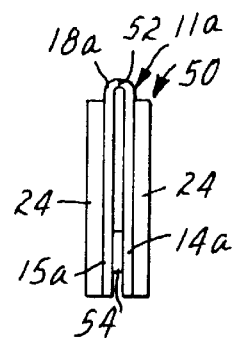
FIG. 6 is an end view of a second embodiment of a tape laminate according to the present invention.

FIG. 6 illustrates a second embodiment of a tape laminate 50 according to the present invention in which parts that are similar to the parts of the tape laminate 10 are identified by the same reference numeral to which has been added the suffix "a". In the tape laminate 50, the support layer 11a is of paperboard or paper and has perforations 52 along the fold 18a to facilitate such tearing. Grasping a wall hanging which the tape laminate 50 is supporting on a wall provides leverage to assist in tearing the support layer 11a along the perforations 52.

The tape laminate 50 illustrated in FIG. 6 also includes means in the form of a layer 54 of releasable adhesive between the adjacent surfaces of the first and second parts 14a and 15a for restricting pivotal movement of those first and second parts 14a and 15a relative to each other until a predetermined force is applied to separate them. The adhesive in the layer 54 is selected (e.g., the adhesive described in U.S. Pat. No. 3,691,140) so that the first and second parts 14a and 15a can be manually pealed apart with relative ease. The adhesive in the layer 54 primarily functions to restrict unwanted movement of the first and second parts 14a and 15a prior to application of the tape laminate 50 to objects and unwanted movement of those objects joined by the tape laminate 50 away from each other until they are moved away from each other for the purpose of separating them. Such a layer 54 of adhesive could be used in other of the embodiments of the tape laminate illustrated herein, particularly including the tape laminates illustrated in FIGS. 1 through 12.

Figure 7:
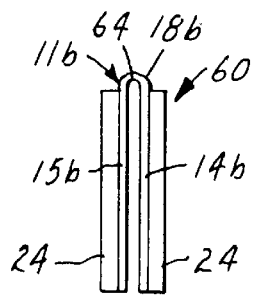
FIG. 7 is an end view of a third embodiment of a tape laminate according to the present invention.

FIG. 7 illustrates a third embodiment of a tape laminate 60 according to the present invention in which parts that are similar to the parts of the tape laminate 10 are identified by the same reference numeral to which has been added the suffix "b". In the tape laminate 60 the support layer 11b is made from a polymeric material and provides means for facilitating the fold 18b in the support layer 11b. That means for facilitating folding is provided by the support layer 11b being formed as an extrusion of two materials, with a more rigid material (e.g., a 0.020 inch (0.051 centimeter) thick layer of the polyvinyl chloride available under the trade designation #87256 from B.F. Goodrich) forming each of its end parts 14b and 15b, and a layer of a more flexible material (e.g., a 0.017 to 0.023 inch (0.04 to 0.06 centimeter) thick 0.06 inch (0.15 centimeter) wide layer of the polyurethane available from Dow Chemical Co. under the trade designation pelathane #2352) forming its central part 64 in which the fold 18b is formed.

Figure 8B:
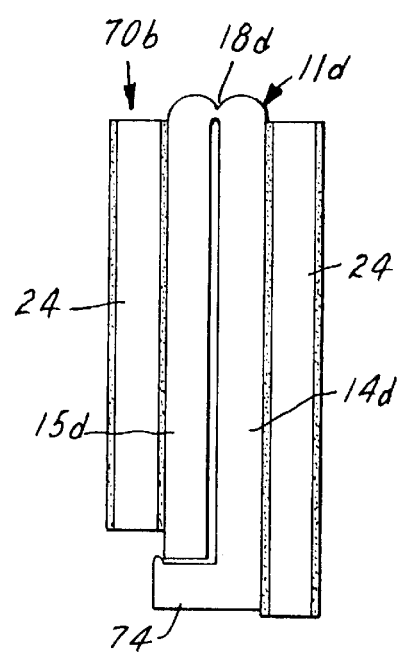
Figure 8A:
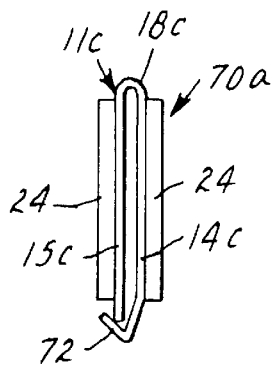
FIG. 8a is an end view of a fourth embodiment of a tape laminate according to the present invention.

FIG. 8a illustrates a fourth embodiment of a tape laminate 70a according to the present invention in which parts that are similar to the parts of the tape laminate 10 are identified by the same reference numeral to which has been added the suffix "c". In the tape laminate 70a the support layer 11c can be made from either a paperboard or paper material, or a polymeric material of the types described above, and could include the means for facilitating the fold 18c in the support layer 11c described above with reference to FIGS. 6 and 7. As illustrated, the end part 14c is folded to provide a projecting portion 72 at its end opposite the bend 18c on which projection 72 the edge of the end part 15c opposite the bend 18c can be supported to help support an object to which the end part 15c is adhered. Such support on the projection 72 helps to stabilize an object supported on another object by the tape laminate 70a and helps to insure that the support layer 11c will not separate along the bend 18c when the tape laminate 70a is in use.

FIG. 8b illustrates a modification of the fourth embodiment of the tape laminate 70a according to the present invention which is identified by the reference numeral 70b and in which parts that are similar to the parts of the tape laminate 10 are identified by the same reference numeral to which has been added the suffix "d". In the tape laminate 70b the support layer 11d is made from a polymeric material and includes means for facilitating the fold 18d in the support layer 11d. As is illustrated in FIG. 8, that means for facilitating bending is provided by the support layer 11d being formed by an extrusion or molding process of one material with each of its end parts 14d and 15d having a first thickness (e.g., 0.060 inch or 0.15 centimeter), and its part in which the bend 18d is formed being made much thinner to form what is called a "living hinge". When the support layer 11d is made in this way, optionally, as illustrated, the end part 14d can have a projection 74 from its end opposite the bend 18d on which projection 74 the edge of the end part 15d opposite the bend 18d can be supported to help support an object to which the end part 15d is adhered from an object to which the end part 14d is adhered and. Such support on the projection 74 helps to stabilize an object supported on another object by the tape laminate 70b and helps to insure that the support layer 11d will not separate along the bend 18d when the tape laminate 70b is in use.

Figure 9:
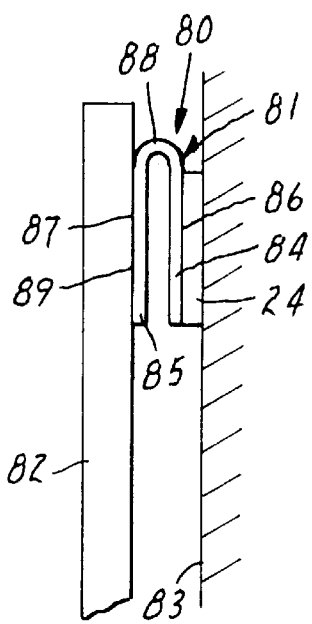
FIG. 9 is an end view of a fifth embodiment of a tape laminate according to the present invention shown adhering a fragment of a wall hanging or container to a wall.

Referring now to FIG. 9 of the drawing, there is illustrated a fifth embodiment of a tape laminate 80 according to the present invention which comprises a support layer 81 having opposite major surfaces, first and second parts 84 and 85 adjacent its opposite ends, and an anchor portion 86 or 87 of the same one of its major surfaces on each of its parts 84 or 85. The support layer 81 has a fold 88 so that the first and second parts 84 and 85 of the support layer 81 are disposed with the anchor portions 86 and 87 on opposite sides of the support layer 81 and in generally parallel relationship.

Means are provided for bonding the anchor portions 86 or 87 to the opposed surfaces of rigid objects such as a wall hanging 82 and a wall 83 as illustrated in FIG. 9 so that the tape laminate 80 can support one object from the other (e.g., the wall hanging 82 from the wall 83 as illustrated) against a static force generally parallel to the anchor portions 86 and 87. As illustrated, that means for bonding comprises a layer 89 of permanent adhesive for permanently attaching the anchor portion 87 to the rear surface of the wall hanging 82, and an attachment strip 24 of the type described above having inner and outer opposite major surfaces extending between its ends with portions of its outer and inner major surfaces being defined by pressure sensitive adhesive and its inner major surface being bonded to the anchor portion 86, which attachment strip 24 has a manually engageable tab portion (not shown) at one end. A fold 88 in the support layer 81 affords pivotal movement of the first and second parts 84 and 85 away from each other to provide access to the tab portion 30 of the attachment strip 24 so that the attachment strip 24 can be stretched to remove it from the wall 83 to which it was adhered so that the wall hanging 82 can be taken down. This tape laminate 80 embodiment could be useful, for example, for hanging picture frames, dispensing boxes, signs, and wall plaques.

Figure 10:
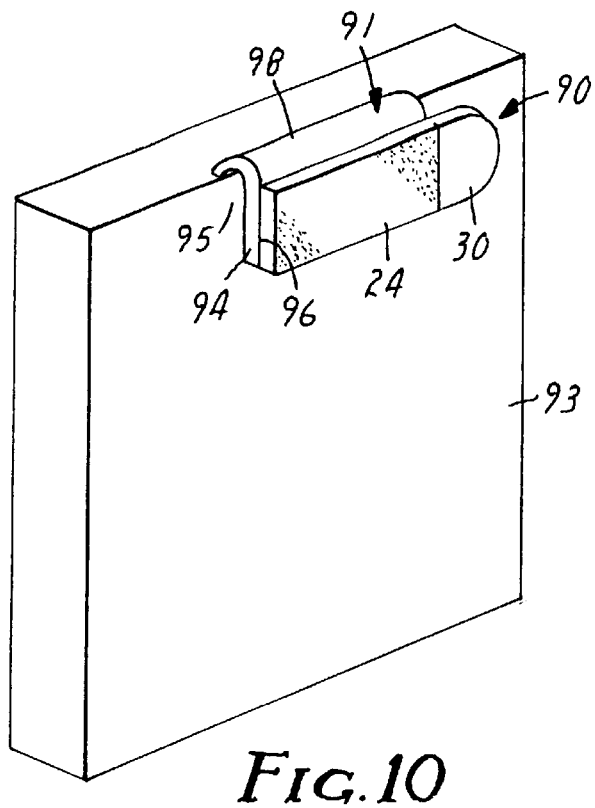
FIG. 10 is a perspective view of a sixth embodiment of a tape laminate according to the present invention in combination with a wall hanging or container.

Referring now to FIG. 10 of the drawing, there is illustrated a sixth embodiment of a tape laminate 90 according to the present invention which comprises a support layer 91 having opposite major surfaces, first and second parts 94 and 95 adjacent its opposite ends, with the part 95 incorporated in the rear wall of a container 93 or other type of wall hanging, and an anchor portion 96 of one of the major surfaces of the part 94. The support layer 91 has a fold 98 so that the first and second parts 94 and 95 of the support layer 91 are disposed in generally parallel relationship. Means are provided for bonding the anchor portion 96 to the surface of a rigid object such as a wall (not shown) so that the tape laminate 90 can support the container 93 from that object or wall against a static force generally parallel to the anchor portion 96. As illustrated, that means for bonding comprises an attachment strip 24 of the type described above having inner and outer opposite major surfaces extending between its ends with portions of its outer and inner major surfaces being defined by pressure sensitive adhesive and its inner major surface being bonded to the anchor portion 96, and having a manually engageable tab portion 30 at one end. The fold 98 in the support layer 91 affords pivotal movement of the first and second parts 94 and 95 away from each other to provide access to the tab portion 30 of the attachment strip 24 so that the attachment strip 24 can be stretched to remove it from a wall to which it is adhered so that the wall hanging or container 93 can be taken down. This tape laminate 90 embodiment could be useful, for example, for hanging tissue boxes, ant traps, and decorative items. The support layer 91 (like the support layer 81 described above) could be of a fibrous material such as paperboard, or of a polymeric material, or could be of a thin metal such as aluminum.

Figure 11:
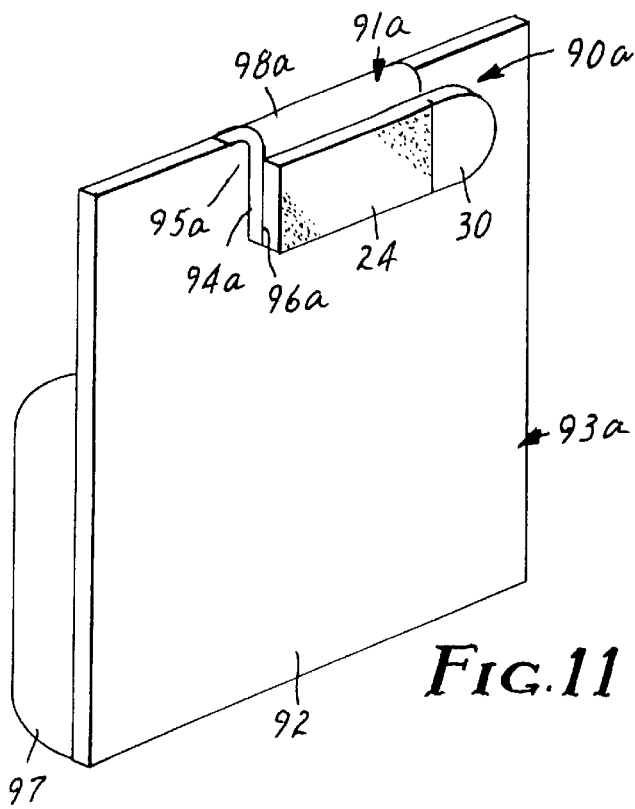
FIGS. 11 and 12 are perspective views of two different modifications of the sixth embodiment of a tape laminate according to the present invention in combination with a wall hanging or container that is shown in FIG. 10.
Figure 12:
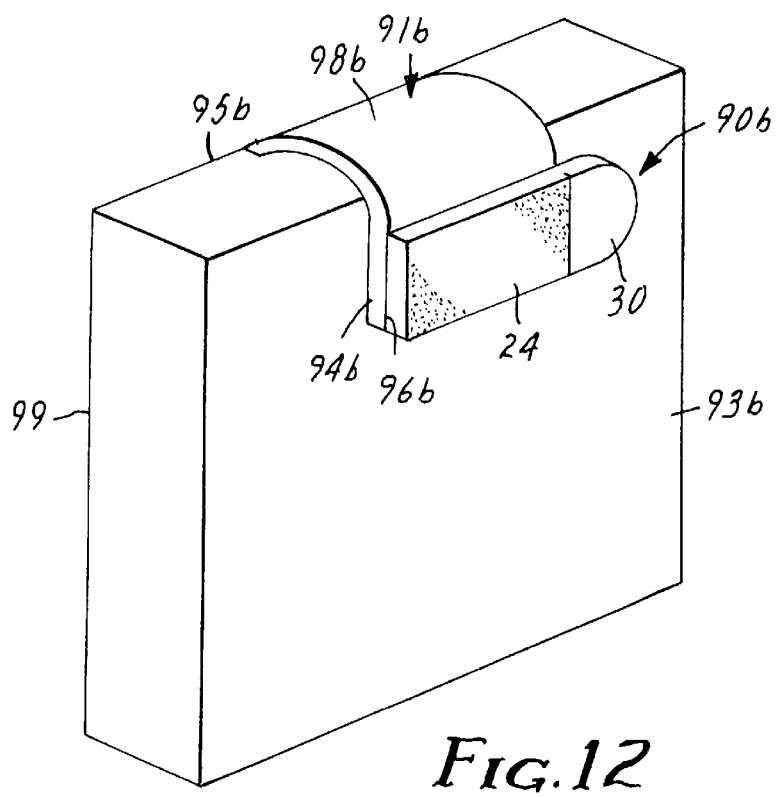

FIGS. 11 and 12 illustrate modifications 90a and 90b of the tape laminate 90. In the tape laminate 90a the container 93a comprises a back card 92 in which the part 95a is incorporated, and a product (not shown) is attached to the front surface of the back card 92 by a layer 97 of polymeric material (e.g., a conventional "blister pack", alternatively, that product could be attached to the back card by other means). In the tape laminate 90b the part 95b is incorporated in a front wall 99 of the container 93b and the support layer 91b extends over a top wall of the container 93b.

Figure 13:
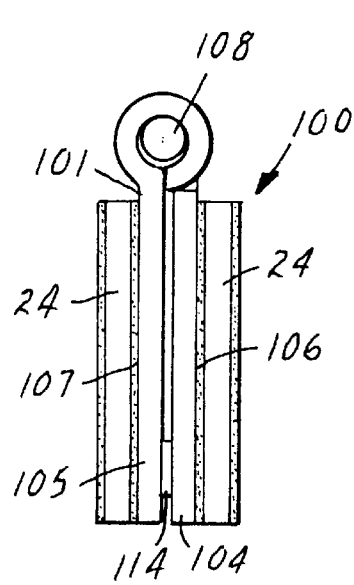
FIG. 13 is an end view of a seventh embodiment of a tape laminate according to the present invention.
Figure 14:
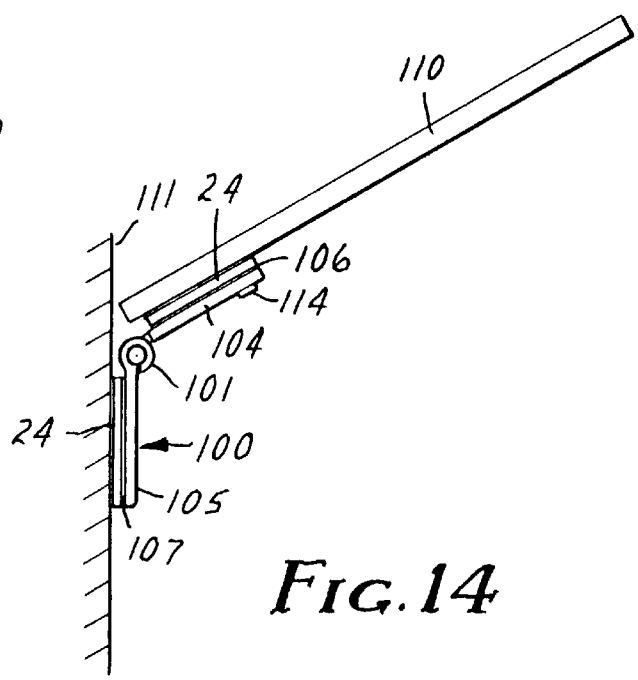
FIG. 14 is an end view of the embodiment of the tape laminate illustrated in FIG. 13 shown attaching a wall hanging to a wall and shown with the wall hanging lifted away from the wall so that parts of the tape laminate are separated and can be removed from the wall and/or wall hanging.

Referring now to FIGS. 13 and 14 of the drawing, there is illustrated a seventh embodiment of a tape laminate 100 according to the present invention. Generally, the tape laminate 100 comprises a support layer 101 in the form of a conventional hinge such as that type called a "piano hinge" which could be of metal or of a polymeric material. That support layer 101 has opposite major surfaces, first and second parts 104 and 105 adjacent its opposite ends, and an anchor portion 106 or 107 of the same one of its major surfaces on each of its parts 104 or 105. The support layer 101 is folded about a hinge pin 108 so that the first and second parts 104 and 105 of the support layer 101 are disposed with the anchor portions 106 and 107 on opposite sides of the support layer 101 and in generally parallel relationship. Means are provided for bonding the anchor portions 106 or 107 to the opposed surfaces of rigid objects such as a wall hanging 110 and a wall 111 as illustrated in FIG. 14 so that the tape laminate 100 can support one object from the other (e.g., the wall hanging 110 from the wall 111 as illustrated) against a static force generally parallel to the anchor portions 106 and 107. As illustrated, that means for bonding comprises two attachment strips 24 of the type described above each having inner and outer opposite major surfaces extending between its ends with portions of its outer and inner major surfaces being defined by pressure sensitive adhesive and its inner major surface being bonded to one of the anchor portions 106 or 107, and each having a manually engageable tab portion (not shown) at one end. The attachment strips 24 are stretchable by being pulled at their tab portions to release adhesive engagement of their outer and inner major surfaces 26 from the objects or wall hanging 110 and wall 111 to which their outer major surfaces 26 are adhered and from the anchor portions 106 and 107 on the support layer 101. The tape laminate 100 includes separating means for affording separation of the first and second parts 104 and 105 of the support layer 101 to afford sufficient separation of rigid objects (e.g., the wall hanging 110 and wall 111) to which the anchor portions 106 and 107 are bonded by the attachment strips 24 with the tab portions therebetween to afford access to the tab portions and thereby separation of at least one of the attachment strips 24 from one of the rigid objects (e.g., the wall 111) by stretching that attachment strip 24. That means is provided by the hinge pin 108 between the first and second parts 104 and 105 of the support layer 101, which hinge pin 108 affords pivotal movement of the first and second parts 104 and 105 away from each other as illustrated in FIG. 14 to provide such access to the tab portions (not shown) of the attachment strips 24 so that at least one of the attachment strips 24 can be stretched to remove it from the object to which it was adhered (e.g., the attachment strip 24 adhered to the wall 111 can be removed so that the wall hanging 110 can be taken down). As with the tape laminate 10, if a wall hanging is too large or heavy to be supported by a single tape laminate 100, more than one tape laminate 100 (two, three or more) can be used with their hinge pins 108 aligned to support the wall hanging from a wall. Also, (as with the parts of the other tape laminates described herein) the parts 104 and 105 of the tape laminate 100 can be shaped so that the attachment strips 24 extend away at 90 degrees from the axis of bending between the parts 104 and 105 defined by the hinge pin 108 with their tab portions at the ends of the attachment strips 24 opposite the hinge pin 108, and if the parts 104 and 105 have sufficient length in a direction parallel to that axis of bending, two, three or more attachment strips 24 can be used on each of the parts 104 and 105.

The tape laminate 100 illustrated in FIGS. 13 and 14 also includes means in the form of a layer 114 of material between the adjacent surfaces of the first and second parts 104 and 105 for restricting pivotal movement of those first and second parts 104 and 105 relative to each other until a predetermined force is applied to separate them, which layer 114 of material primarily functions to restrict unwanted movement of the first and second parts 104 and 105 prior to application of the tape laminate 100 to objects and unwanted movement of those objects joined by the tape laminate 100 away from each other until they are manually moved away from each other for the purpose of separating them. That material in the layer 114 can be adhesive of the type in the layer 54 described above with reference to FIG. 6, or can be of magnetized material if the first and second parts 104 and 105 are of a material such as steel that is attracted to magnetized material.

Figure 15:
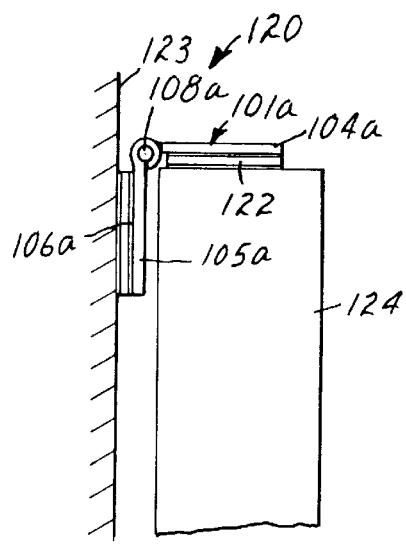
FIG. 15 is an end view of an eighth embodiment of a tape laminate according to the present invention shown attaching a fragment of a wall hanging to a wall.

Referring now to FIG. 15 of the drawing, there is illustrated an eighth embodiment of a tape laminate 120 according to the present invention in which parts that are similar to the parts of the tape laminate 100 are identified by the same reference numeral to which has been added the suffix "a". Generally, the tape laminate 120 comprises a support layer or conventional hinge 101a, which support layer 101a has opposite major surfaces, first and second parts 104a and 105a adjacent its opposite ends, and an anchor portion 106a of one of its major surfaces on its part 105a, and an anchor portion 122 on the other of its major surfaces on its part 104a. The support layer 101a is folded about a hinge pin 108a so that the first and second parts 104a and 105a of the support layer 101a are disposed with the anchor portions 106a and 122 at generally a right angle relationship with respect to each other. Means are provided for bonding the anchor portions 106a and 122 to the surfaces of rigid objects disposed at a right angle with respect to each other such as a wall 123 and the top surface of a wall hanging 124 as is illustrated in FIG. 15 so that the tape laminate 120 can support one object from the other (e.g., the wall hanging 124 from the wall 123 as illustrated) against a static force generally parallel to the anchor portion 106a. As illustrated, that means for bonding comprises two attachment strips 24 of the type described above each having inner and outer opposite major surfaces extending between its ends with portions of its outer and inner major surfaces being defined by pressure sensitive adhesive and its inner major surface being bonded to one of the anchor portions 106a or 122, and each having a manually engageable tab portion (not shown) at one end. The attachment strips 24 are stretchable by being pulled at their tab portions to release adhesive engagement of their outer and inner major surfaces from the objects or wall hanging 124 and wall 123 to which their outer major surfaces are adhered and from the anchor portions 106a and 122 on the support layer 101a to which they were adhered. The tape laminate 120 includes separating means for affording separation of the first and second parts 104a and 105a of the support layer 101a to afford sufficient separation of rigid objects (e.g., the wall hanging 124 and wall 123) to which the anchor portions 106a and 107a are bonded by the attachment strips 24 to afford access to the tab portion on the attachment strip 24 between the anchor portion 106a and the wall 123 so that it can be removed by stretching that attachment strip 24. That means is provided by the hinge pin 108a between the first and second parts 104a and 105a of the support layer 101a, which hinge pin 108a affords pivotal movement of the first and second parts 104a and 105a away from each other to provide such access to that tab portion.

Figure 16:
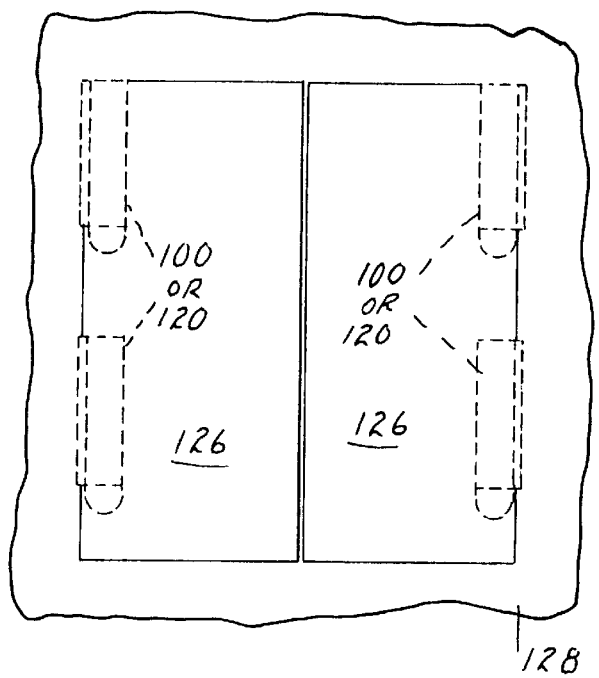
FIG. 16 is a front view of two panels being attached to a wall by four of the tape laminates of either FIG. 8 or FIG. 13 or FIG. 15.
Figure 17:
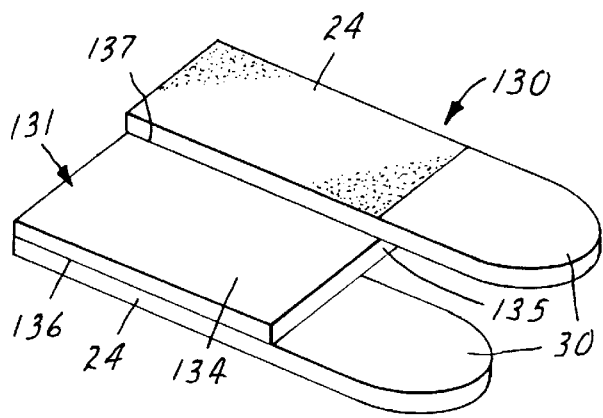
FIG. 17 is a perspective view of a ninth embodiment of a tape laminate according to the present invention.

As is illustrated in FIG. 16, two or more of either of the tape laminates 100 or 120 can be used along one side of each of a pair of wall hangings or panels 126 to support them from a wall 128 and afford pivoting them about vertical axes. Such support of one or more panels may be useful for certain purposes, such as to support the two panels 126 across a space (e.g., across the bottom portion of a window).

While the support layer 101 or 101a in the tape laminate 100 or 120 described above is illustrated as the type of conventional hinge called a "piano hinge", other conventional hinge structures could be used for that support layer 101 or 101a, such as the inexpensive hinge structures including a plurality of balls pivotally engaged in sockets that are often used as the hinge structures between the body and cover of small polymeric boxes.

Figure 21:
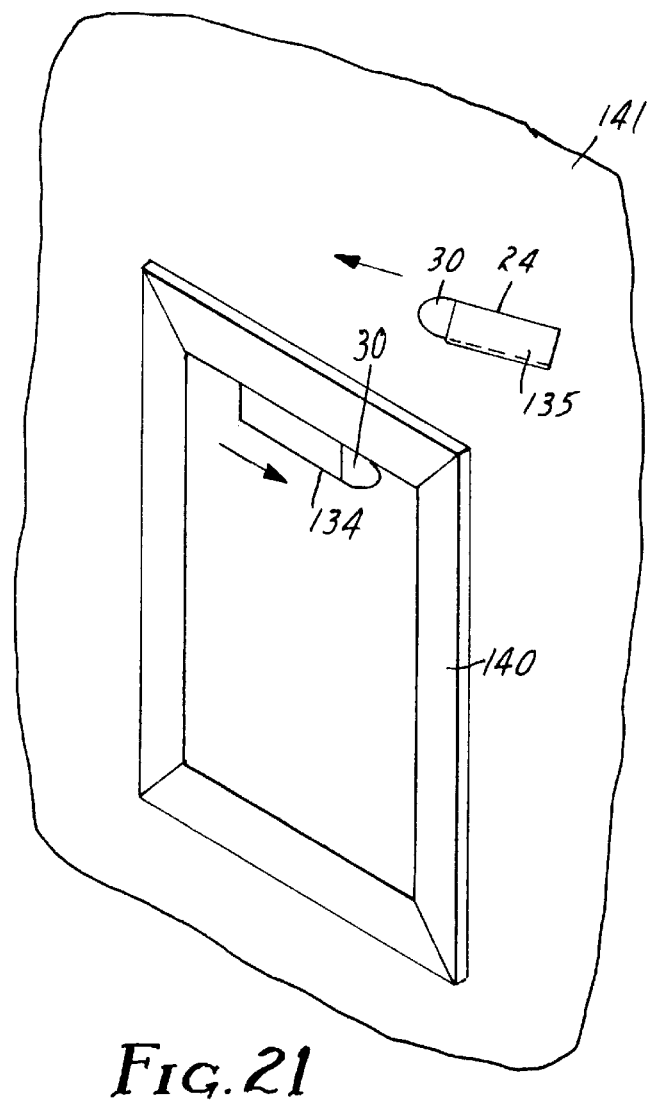
FIG. 21 is a perspective view illustrating removing separated parts of the tape laminate of FIGS. 17 and 18 from the wall hanging and wall illustrated in FIGS. 19 and 20 after the wall hanging has been removed from the wall as illustrated in FIG. 19.

Referring now to FIGS. 17 through 21 of the drawing, there is illustrated a ninth embodiment of a tape laminate 130 according to the present invention. Generally, the tape laminate 130 comprises a support layer 131 having opposite major surfaces, first and second parts 134 and 135 adjacent its opposite ends, and an anchor portion 136 or 137 of different ones of its major surfaces on each of its parts 134 and 135. The first and second parts 134 and 135 of the support layer 131 are disposed with the anchor portions 136 and 137 on opposite sides of the support layer 131 and in generally parallel relationship. Means are provided for bonding the anchor portions 136 or 137 to the opposed surfaces of rigid objects such as a wall hanging 140 and a wall 141 as illustrated in FIGS. 19 and 20 so that the tape laminate 130 can support one object from the other (e.g., the wall hanging 140 from the wall 141 as illustrated) against a static force generally parallel to the anchor portions 136 and 137. As illustrated, that means for bonding comprises two of the attachment strips 24 described above each having inner and outer opposite major surfaces 26 extending between its ends with portions of its outer and inner major surfaces 26 being defined by pressure sensitive adhesive and its inner major surface being bonded to one of the anchor portions 136 or 137, and each having a manually engageable tab portion 30 at one end. The attachment strips 24 are stretchable by being pulled at their tab portions 30 to release adhesive engagement of their outer and inner major surfaces 26 from the objects or wall hanging 140 and wall 141 to which their outer major surfaces 26 are adhered and from the anchor portions 136 and 137 on the support layer 131 to which they were adhered. The tape laminate 130 includes separating means for affording separation of the first and second parts 134 and 135 of the support layer 131 to afford sufficient separation of rigid objects (e.g., the wall hanging 140 and wall 141) to which the anchor portions 136 and 137 are bonded by the attachment strips 24 with the tab portions 30 therebetween to afford access to the tab portions 30 and thereby separation of at least one of the attachment strips 24 from one of the rigid objects (e.g., from the wall 141) by stretching that attachment strip 24. That means is provided by the support layer 131 being transversely tearable or separable between its first and second parts 134 and 135 as is illustrated in FIG. 20 to provide such access to the tab portions 30 of the attachment strips 24 as is illustrated in FIG. 21 so that the attachment strips 24 can be stretched to remove them from the objects to which they were adhered.

The support layer 131 has an internal static shear and tensile strength in a direction parallel to its anchor surfaces 136 and 137 that is adapted to support objects between which it is attached in that direction (e.g., preferably, but not necessarily, a shear and tensile strength that exceeds the highest shear strength that the pressure sensitive adhesive can develop with surfaces to which it is applied (e.g., 6 pounds per square inch)), and has a transverse sequential tear strength between its first and second parts 134 and 135 selected so that it will afford separation of the support layer 131 by transversely tearing the support layer 131 between the attachment strips 24 without damaging the surfaces of the objects to which the tape laminate 130 is adhered (e.g., a dynamic transverse tear strength preferably in the range of about 6 to 20 pounds, which tear strength should be no greater than about 30 pounds even if the tape laminate 130 is to be used to adhere an object to a strong substrate such as a ceramic material or metal with a baked on paint finish; and is no greater than about 5 to 6 pounds if the tape laminate 130 is to be used to adhere an object to a relatively weak substrate such as is provided by some wall papers, particularly if the attachment strips could be adhered to a portion of that wall paper that was not well adhered to the wall behind it).

When, as is illustrated in FIG. 19, the outer adhesive surfaces of the attachment strips 24 are adhered to the opposed surfaces of two objects such as a framed picture 140 and a wall 141, the tape laminate 130 can support one of the objects (i.e., the picture 140) from the other object (i.e., the wall 141) against a continuous force applied in a direction generally parallel to the anchor surfaces 136 and 137 of the support layer 131 and the opposed surfaces of the joined objects 140 and 141. As is illustrated in FIG. 20, however, the objects 140 and 141 can again be separated by applying a transverse sequential tearing force to transversely tear and separate the support layer 131 between its end parts 134 and 135. After separation of the support layer 131, the attachment strips 24 can each be stretched by manually engaging and pulling on their tab portions 30 in the direction indicated by the arrows in FIG. 21 to cleanly separate the attachment strips 24 and the parts 134 and 135 of the support layer 131 adhered thereto from the objects 140 and 141.

As was previously noted, preferably the attachment strips 24 used in the tape laminate 130 are those described in U.S. patent application Ser. No. 08/308,937 (Bries et al). As is illustrated in FIG. 18, those attachment strips 24 generally comprise a central layer 143 of polymeric foam (e.g., polyolefin foam), two layers 144 of stretchable polymeric film (e.g., polyethylene or polypropylene film, with linear low density and ultra linear low density polyethylene film being preferred) bonded along opposite major surfaces of the layer 143 of foam, and two layers 145 of adhesive that define the major adhesive surfaces of the attachment strip 24 and are adhered along major surfaces of the layers 144 of film opposite those bonded along the layer 143 of foam. The attachment strips 24 preferably are about three quarter inch (1.9 centimeter) wide, as a wider attachment strip may be too difficult to stretch to cause release of the layers 145 of adhesive. The layers 145 of adhesive on the attachment strip 24 can be made as long as necessary to provide the desired amount of holding force on a substrate.

Figure 22:
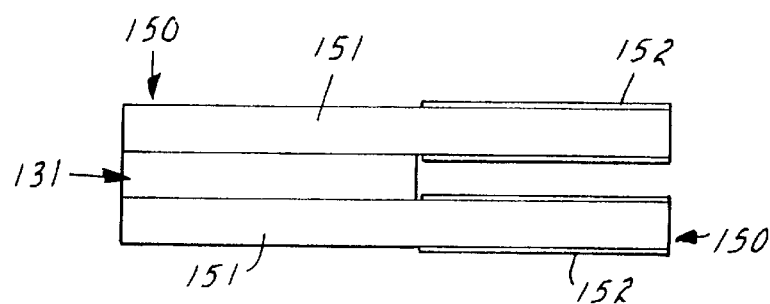
FIG. 22 is a side view illustrating a modification of the tape laminate of FIGS. 17 and 18.

As was also previously noted, alternatively, the attachment strip 24 could consist of two layers of adhesive that define the major adhesive surfaces of the attachment strip 24 adhered along opposite major surfaces of a single layer of stretchable polymeric film, or (as is illustrated in FIG. 22) could be the attachment strips 150 described in U.S. Pat. No. 5,409,189 (Luhmann), which attachment strips 150 each include a single layer 151 of pressure sensitive adhesive that would define the two major adhesive surfaces of the attachment strip 24, and each have polymeric film coverings 152 over their projecting tab end portions 30 to keep them from adhering together and to provide non-sticky surfaces for their tab end portions 30 by which the layers 151 of pressure sensitive adhesive can be stretched to cause them to release from surfaces between which they have been adhered. Also, one of the attachment strips 24 could be modified so that only its outer surfaces is defined by a layer of pressure sensitive adhesive, and its inner surface could be bonded to one of the anchor surfaces 136 or 137 of the support layer 131 by other means such as a hot melt or radiation curable adhesive, or thermal bonding. Such other means of bonding might reduce the cost of production of the tape laminate 130, however, that modified attachment strip 24 could not be stretched to remove it from a surface to which it was adhered.

Materials from which the support layer 131 can be made include polymeric foam, paper, non-woven materials and corrugated paper. When the tape laminate 130 is used to attach an object to the surface of wallpaper or unpainted drywall, the dynamic tensile force required to sequentially transversely tear the support layer 131 should be no more than about 8 to 10 pounds to limit the possibility of damage to such surfaces. In contrast, when the tape laminate 130 is used to attach an object to some painted surfaces (e.g., the surface of a painted cement block wall, or a metal cabinet with baked on paint) or to the surface of glass or ceramic material, the dynamic tensile force required to transversely tear the support layer 131 can be in the range or 30 to 35 pounds or even 40 pounds without causing damage to such surfaces. When the tape laminate 130 is used to attach an object to the surface of yet other types of materials (e.g., wood or veneer) the dynamic tensile force required to transversely tear the support layer 131 should be less than about 20 pounds to restrict damage to those surfaces. Different embodiments of the tape laminate 130 can be made with support layers 131 of different materials that require different dynamic tensile forces to transversely tear and thus separate the support layer 131 as may be appropriate for use of the tape laminate 130 on different substrates. Such different embodiments of the tape laminate 130 can be coded by making them in different shapes and/or colors to indicate the substrates on which their use is appropriate.

Figure 23:
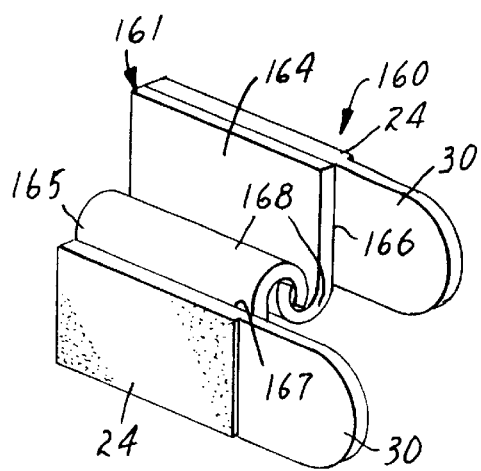
FIG. 23 is a perspective view of a tenth embodiment of a tape laminate according to the present invention.
Figure 24:
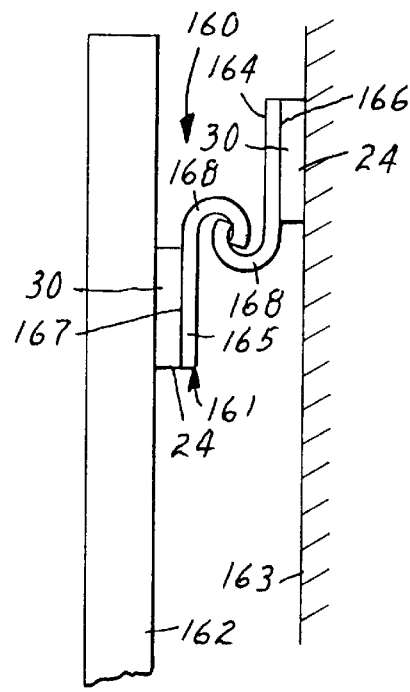
FIG. 24 is an end view of the embodiment of the tape laminate illustrated in FIG. 23 shown attaching a wall hanging to a wall.

Referring now to FIGS. 23 and 24 of the drawing, there is illustrated a tenth embodiment of a tape laminate 160 according to the present invention. Generally, the tape laminate 160 comprises a support layer 161 having opposite major surfaces, first and second parts 164 and 165 adjacent its opposite ends, and an anchor portion 166 or 167 of different ones of its major surfaces on each of its parts 164 and 165. The first and second parts 164 and 165 of the support layer 161 are disposed with the anchor portions 166 and 167 on opposite sides of the support layer 161 and in generally parallel relationship. Means are provided for bonding the anchor portions 166 or 167 to the opposed surfaces of rigid objects such as a wall hanging 162 and a wall 163 as illustrated in FIG. 24 so that the tape laminate 160 can support one object from the other (e.g., the wall hanging 170 from the wall 171 as illustrated) against a static force generally parallel to the anchor portions 166 and 167. As illustrated, that means for bonding comprises two of the attachment strips 24 described above each having inner and outer opposite major surfaces extending between its ends with portions of its outer and inner major surfaces being defined by pressure sensitive adhesive and its inner major surface being bonded to one of the anchor portions 166 or 167, and each having a manually engageable tab portion 30 at one end. The attachment strips 24 are stretchable by being pulled at their tab portions 30 to release adhesive engagement of their outer and inner major surfaces from the objects or wall hanging 162 and wall 163 to which their outer major surfaces are adhered and from the anchor portions 166 and 167 on the support layer 161 to which they were adhered. The tape laminate 160 includes separating means for affording separation of the first and second parts 164 and 165 of the support layer 161 to afford sufficient separation of rigid objects (e.g., the wall hanging 162 and wall 163) to which the anchor portions 166 and 167 are bonded by the attachment strips 24 with the tab portions 30 therebetween to afford access to the tab portions 30 and thereby separation of at least one of the attachment strips 24 from one of the rigid objects (e.g., from the wall 163) by stretching that attachment strip 24. That means is provided in that the support layer 161 includes means releasably engaging its first and second parts 164 and 165 comprising a generally J-shaped lip 168 along the edge of each of the parts 164 and 165. The lips 168 are frictionally engaged with each other, but can be manually slid longitudinally relative to each other in opposition to that frictional engagement to separate the lips 168, thereby separating the first and second parts 164 and 165 of the support layer 161 and providing access to the tab portions 30 of the attachment strips 24 so that the attachment strips 24 can be stretched to remove them from the objects (e.g., the wall 163 and wall hanging 162) to which they were adhered.

Figure 25:
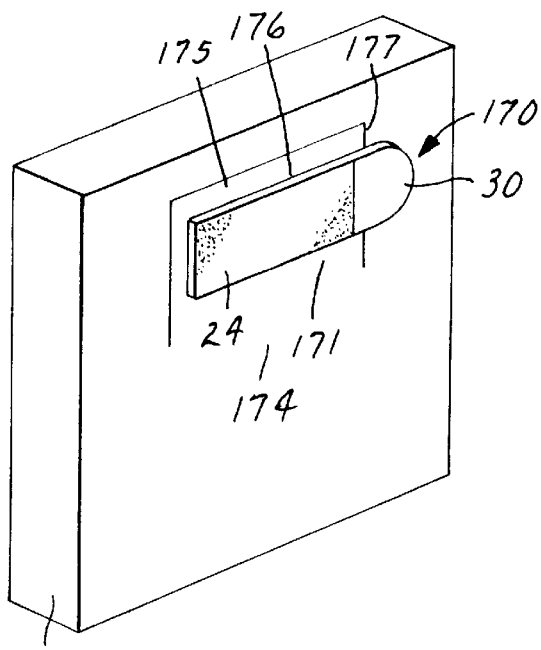
FIG. 25 is a perspective view of an eleventh embodiment of a tape laminate according to the present invention in combination with a container or wall hanging.

Referring now to FIG. 25 of the drawing, there is illustrated an eleventh embodiment of a tape laminate 170 according to the present invention which comprises a support layer 171 having opposite major surfaces and first and second parts 174 and 175 adjacent its opposite ends, with the first part 174 incorporated in the rear wall of a container or other type of wall hanging 173. The second part 175 of the support layer 171 was cut from the rear wall of the wall hanging 173 along a U-shaped cut line 177 and the first and second parts 174 and 175 of the support layer 171 are disposed in generally parallel relationship. Means are provided for bonding an anchor portion 176 of the surface of the second part 175 to the surface of a rigid object such as a wall (not shown) so that the tape laminate 170 can support the wall hanging 173 from that object or wall against a static force generally parallel to the anchor portion 176. As illustrated, that means for bonding comprises an attachment strip 24 of the type described above having inner and outer opposite major surfaces extending between its ends with portions of its outer and inner major surfaces 26 being defined by pressure sensitive adhesive and its inner major surface being bonded to the anchor portion 176, and having a manually engageable tab portion 30 at one end. The support layer 171 can be transversely torn between opposite the ends of the U-shaped cut 177 to afford separation of the first and second parts 174 and 175 of the support layer 171 from each other. Such separation of the parts 174 and 175 affords separation of the wall hanging 173 from the wall and access to the tab portion 30 of the attachment strip 24 so that the attachment strip 24 can be stretched to remove it and the second part 175 of the support layer 171 from the wall to which it was adhered. This tape laminate 170 embodiment could be useful, for example, for hanging a dispensing box of tissues, or a dispensing box of coffee filters.

Figure 26:
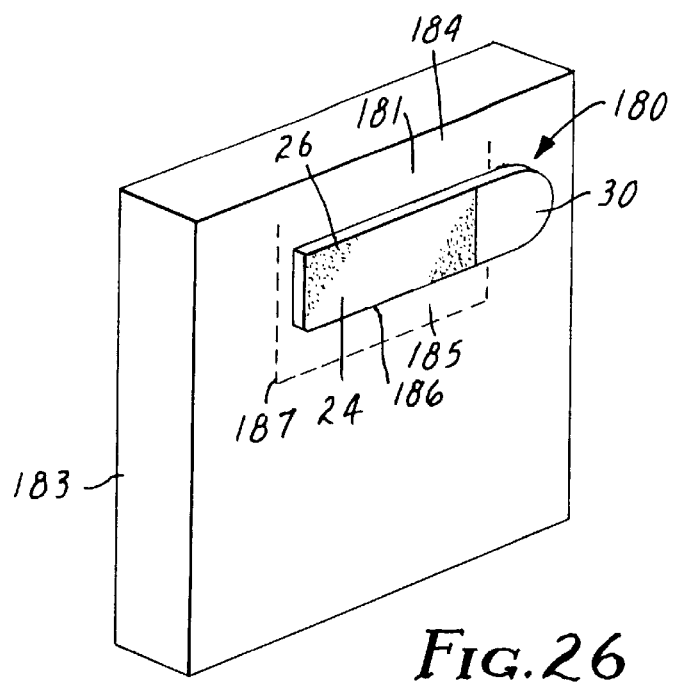
FIG. 26 is a perspective view of a twelfth embodiment of a tape laminate according to the present invention in combination with a container or wall hanging.

Referring now to FIG. 26 of the drawing, there is illustrated a twelfth embodiment of a tape laminate 180 according to the present invention which comprises a support layer 181 having opposite major surfaces and first and second parts 184 and 185 adjacent its opposite ends, with the first part 184 incorporated in the rear wall of a container or other type of wall hanging 183. The second part 185 of the support layer 181 was partially cut from the rear wall of the wall hanging 183 along a U-shaped line of perforations 187 and the first and second parts 184 and 185 of the support layer 181 are disposed in generally parallel relationship. Means are provided for bonding an anchor portion 186 of the surface of the second part 185 to the surface of a rigid object such as a wall (not shown) so that the tape laminate 180 can support the wall hanging 183 from that object or wall against a static force generally parallel to the anchor portion 186. As illustrated, that means for bonding comprises an attachment strip 24 of the type described above having inner and outer opposite major surfaces extending between its ends with portions of its outer and inner major surfaces 26 being defined by pressure sensitive adhesive and its inner major surface being bonded to the anchor portion 186, and having a manually engageable tab portion 30 at one end. When removal of the wall hanging from a wall is desired, the first part 184 can be manually separated from the second part 185 along the line of perforations 187. The first part 184 can then be pivoted away from the second part 185 by bending the support layer 181 between its parts 184 and 185 to provide access to the tab portion 30 of the attachment strip 24 so that the attachment strip 24 can be stretched to remove it from the wall to which it is adhered and the wall hanging or container 183 can be taken down. This tape laminate 180 embodiment could be useful, for example, for hanging a dispensing box for tissues, coffee filters or medical products.

Figure 27:
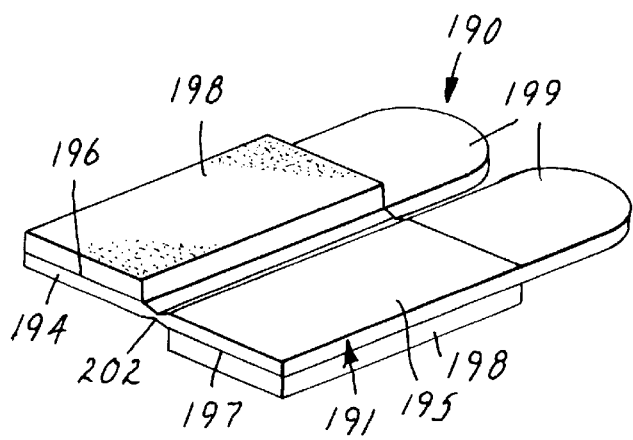
FIG. 27 is a perspective view of a thirteenth embodiment of a tape laminate according to the present invention.
Figure 28:
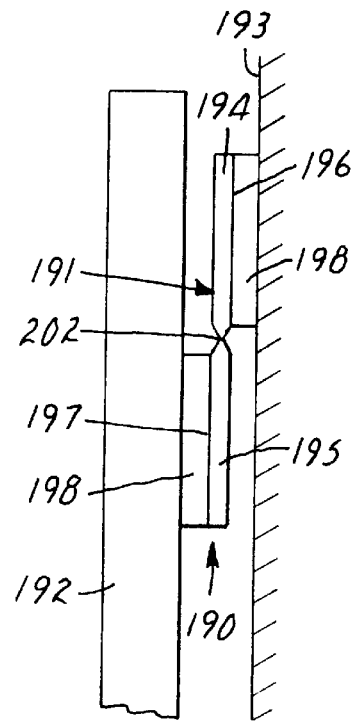
FIG. 28 is an end view of the embodiment of the tape laminate illustrated in FIG. 27 shown attaching a wall hanging to a wall.

Referring now to FIGS. 27 and 28 of the drawing, there is illustrated a thirteenth embodiment of a tape laminate 190 according to the present invention. Generally, the tape laminate 190 comprises a support layer 191 having opposite major surfaces, first and second parts 194 and 195 adjacent its opposite ends, and an anchor portion 196 or 197 of different ones of its major surfaces on each of its parts 194 and 195. The first and second parts 194 and 195 of the support layer 191 are disposed with the anchor portions 196 and 197 of its major surfaces on opposite sides of the support layer 191 and in generally parallel relationship. Means are provided for bonding the anchor portions 196 or 197 to the opposed surfaces of rigid objects such as a wall hanging 192 and a wall 193 as illustrated in FIG. 28 so that the tape laminate 190 can support one object from the other (e.g., the wall hanging 192 from the wall 193 as illustrated) against a static force generally parallel to the anchor portions 196 and 197. As illustrated, that means for bonding comprises two layers of pressure sensitive adhesive 198 each bonded to a different one of the anchor portions 196 or 197. The support layer 191 is of a stretchable material (e.g., a stretchable polymeric film or foam), and each of its parts 194 and 195 has a manually engageable tab portion 199 at one end. The first and second parts 194 and 195 of the support layer 191 together with the layers of adhesive 198 thereon are stretchable by being pulled at their tab portions 199 to release adhesive engagement of the adhesive layers 198 from the objects or wall hanging 192 and wall 193 to which they are adhered. The tape laminate 190 includes separating means for affording separation of the first and second parts 194 and 195 of the support layer 191 and thereby separation of rigid objects (e.g., the wall hanging 192 and wall 193) to which the anchor portions 196 and 197 are bonded by the adhesive layers 198 with the tab portions 199 therebetween to afford access to the tab portions 199 and thereby separation of one or both of the parts 194 or 195 and the layer of adhesive 198 on it from the rigid objects (e.g., from the wall 193 and wall hanging 192) by stretching that part 194 or 195. That means is provided in that the support layer 191 has a path of weakness 202 (e.g., a transverse thinned cross section as illustrated and/or a row of perforations) between its parts 194 and 195 so that it can be manually torn. Grasping the wall hanging 192 which the tape laminate 190 is supporting on the wall 193 can provide leverage to assist in tearing the support layer 191 along the path of weakness 202. Such separation of the first and second parts 194 and 195 of the support layer 191 will provide access to the tab portions 199 on the parts 194 and 195 so that they can be stretched to remove them from the objects (e.g., the wall 193 and wall hanging 192) to which they were adhered.

Figure 29:
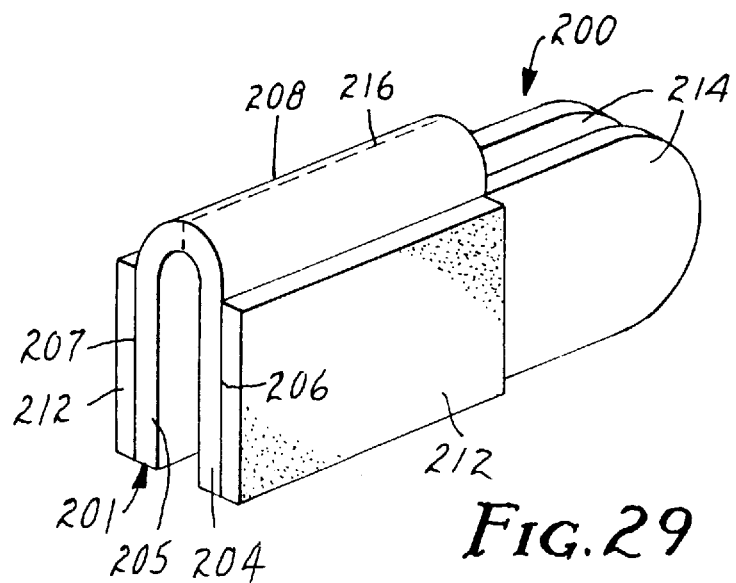
FIG. 29 is a perspective view of a fourteenth embodiment of a tape laminate according to the present invention.
Figure 30:
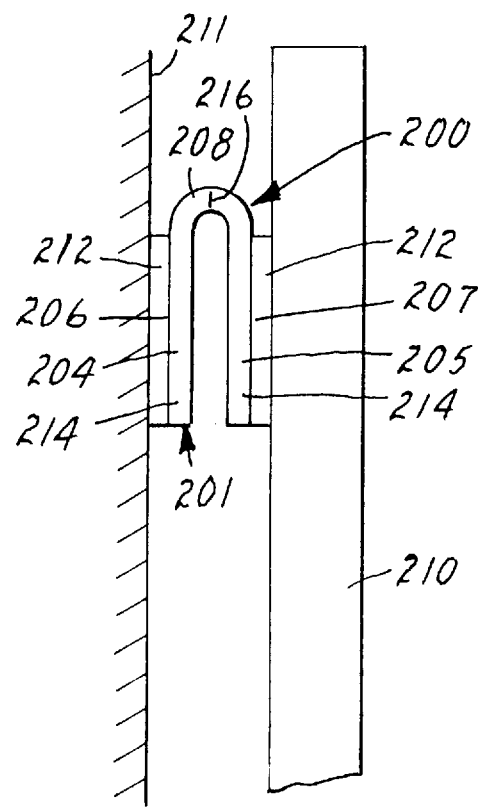
FIG. 30 is an end view of the embodiment of the tape laminate illustrated in FIG. 29 shown attaching a wall hanging to a wall.

Referring now to FIGS. 29 and 30 there is illustrated a fourteenth embodiment of a tape laminate 200 according to the present invention. Generally, the tape laminate 200 comprises a support layer 201 of a stretchable material (e.g., a stretchable polymeric film or foam material) having opposite major surfaces, first and second parts 204 and 205 adjacent its opposite ends, and an anchor portion 206 or 207 of the same one of its major surfaces on each of its parts 204 and 205. The support layer 201 has a fold 208 so that the first and second parts 204 and 205 of the support layer 201 are disposed with the anchor portions 206 and 207 on opposite sides of the support layer 201 and in generally parallel relationship. Means are provided for bonding the anchor portions 206 or 207 to the opposed surfaces of rigid objects such as a wall hanging 210 and a wall 211 as illustrated in FIG. 30 so that the tape laminate 200 can support one object from the other (e.g., the wall hanging 210 from the wall 211 as illustrated) against a static force generally parallel to the anchor portions 206 and 207. As illustrated, that means for bonding comprises two layers of adhesive 212 each having inner and outer opposite major surfaces with its inner major surface being bonded to one of the anchor portions 206 or 207. Each part 204 and 205 of the support layer 201 has a manually engageable tab portion 214 at one end, and is stretchable together with the layer 212 of adhesive adhered to it by having its tab portion 214 pulled to release adhesive engagement of the outer major surface of that layer 212 of adhesive from the objects or wall hanging 210 or wall 211 to which it is adhered. The tape laminate 200 includes separating means for affording separation of the first and second parts 204 and 205 of the support layer 201 to afford sufficient separation of rigid objects (e.g., the wall hanging 210 and wall 211) to which the anchor portions 206 and 207 are bonded by the layers 212 of adhesive to afford access to the tab portions 214 and thereby separation of at least one of the layers 212 of adhesive from one of the rigid objects (e.g., the wall 211) by stretching the part 204 or 205 of the support layer 201 and the layer 212 of adhesive adhered to it. That means can be provided in either of two ways by the fold 208 between the first and second parts 204 and 205 of the support layer 201. The fold 208 can afford pivotal movement of the first and second parts 204 and 205 away from each other so that the parts 204 and 205 can be separated by being cut apart along the fold 208 by a sharp cutting device such as a knife, after which one or both of the separated parts 204 or 205 can be stretched to remove it from the object to which it was adhered. Alternatively, as illustrated the support layer 201 can have a path of weakness 216 (e.g., a row of perforations or a transverse thinned cross section) along the fold 208 so that it can be manually torn. Grasping the wall hanging 210 which the tape laminate 200 is supporting on the wall 211 can then provide leverage to assist in tearing the support layer 201 along the path of weakness 216.

The present invention has now been described with reference to several embodiments and several possible modifications thereof. It will be apparent to those skilled in the art that many changes can be made in the embodiments described without departing from the scope of the present invention. Thus, the scope of the present invention should not be limited to the structures and methods described in this application, but only by the structures and method described by the language of the claims and the equivalents thereof.

What is claimed is:

1. A tape laminate comprising a support layer having opposite major surfaces, first and second parts, and two anchor portions of one of said major surfaces with each of said anchor portions being on a different one of said parts, said support layer being folded between said first and second parts to position said anchor portions on opposite sides of said support layer and in generally parallel relationship;

means for bonding said anchor portions to the opposed surfaces of rigid objects so that the tape laminate can support one object from the other against a static force generally parallel to said anchor portions, said means for bonding comprising a first attachment strip having opposite ends and inner and outer opposite major surfaces extending between said ends, said first attachment strip comprising a first layer of adhesive defining at least a portion of said outer major surface and said inner major surface of said first attachment strip being bonded to said anchor portion on said first part; and means including a tab portion for affording stretching of said first attaching strip by pulling on said tab portion to release adhesive engagement of said first layer of adhesive from an object to which said outer major surface of said first layer of adhesive is adhered, said fold affording pivotal movement of said first and second portions away from each other to provide separation of said first and second parts of said support layer and thereby sufficient separation of rigid objects to which said anchor portions are bonded by said means for bonding with said tab portion therebetween to afford access to said tab portion and release of adhesive engagement of said first layer of adhesive from one of said rigid objects by stretching said attachment strip.

2. A tape laminate according to claim 1 further including means between said parts for restricting pivotal movement of said first and second parts relative to each other until a predetermined force is applied to separate said first and second parts.

3. A tape laminate according to claim 1 wherein said support layer is of polymeric material and includes means in said support layer between said parts affording ease of pivotal movement of said first and second parts relative to each other.

4. A tape laminate according to claim 1 wherein said support layer is a hinge with said parts each having an edge portion mounted on a pin included in the hinge between said parts for pivotal movement relative to each other.

5. A tape laminate according to claim 4 further including means between said parts for restricting pivotal movement of said first and second parts relative to each other until a predetermined force is applied to separate said first and second parts.

6. A tape laminate comprising a support layer having opposite major surfaces, first and second parts, and two anchor portions of one of said major surfaces with each of said anchor portions being on a different one of said parts, said support layer being folded between said first and second parts to position said anchor portions on opposite sides of said support layer and in generally parallel relationship;

means for bonding said anchor portions to the opposed surfaces of rigid objects so that the tape laminate can support one object from the other against a static force generally parallel to said anchor portions, said means for bonding comprising a first attachment strip having opposite ends and inner and outer opposite major surfaces extending between said ends, said first attachment strip comprising a first layer of adhesive defining at least a portion of said outer major surface and said inner major surface of said first attachment strip being bonded to said anchor portion on said first part; and means including a tab portion for affording stretching of said first attaching strip by pulling on said tab portion to release adhesive engagement of said first layer of adhesive from an object to which said outer major surface of said first layer of adhesive is adhered, said support layer being adapted to be torn along said fold to provide separation of said first and second parts of said support layer and thereby separation of rigid objects to which said anchor portions are bonded by said means for bonding with said tab portion therebetween to afford access to said tab portion and release of adhesive engagement of said first layer of adhesive from one of said rigid objects by stretching said attachment strip.

7. A tape laminate comprising a support layer having opposite major surfaces, first and second parts, and two anchor portions of said major surfaces with each of said anchor portions being on a different one of said parts and on a different one of said major surfaces, said support layer being generally planar to thereby position said anchor portions on opposite sides of said support layer and in generally parallel relationship;

means for bonding said anchor portions to the opposed surfaces of rigid objects so that the tape laminate can support one object from the other against a static force generally parallel to said anchor portions, said means for bonding comprising a first attachment strip having opposite ends and inner and outer opposite major surfaces extending between said ends, said first attachment strip comprising a first layer of adhesive defining at least a portion of said outer major surface and said inner major surface of said first attachment strip being bonded to said anchor portion on said first part; and means including a tab portion for affording stretching of said first attaching strip by pulling on said tab portion to release adhesive engagement of said first layer of adhesive from an object to which said outer major surface of said first layer of adhesive is adhered, said support layer being manually tearable between said parts to provide separation of said first and second parts of said support layer and thereby separation of rigid objects to which said anchor portions are bonded by said means for bonding with said tab portion therebetween to afford access to said tab portion and release of adhesive engagement of said first layer of adhesive from one of said rigid objects by stretching said attachment strip.

8. A tape laminate comprising a support layer having opposite major surfaces, first and second parts, and two anchor portions of said major surfaces with each of said anchor portions being on a different one of said parts and on a different one of said major surfaces, said support layer being generally planar to thereby position said anchor portions on opposite sides of said support layer and in generally parallel relationship;

means for bonding said anchor portions to the opposed surfaces of rigid objects so that the tape laminate can support one object from the other against a static force generally parallel to said anchor portions, said means for bonding comprising a first attachment strip having opposite ends and inner and outer opposite major surfaces extending between said ends, said first attachment strip comprising a first layer of adhesive defining at least a portion of said outer major surface and said inner major surface of said first attachment strip being bonded to said anchor portion on said first part; and means including a tab portion for affording stretching of said first attaching strip by pulling on said tab portion to release adhesive engagement of said first layer of adhesive from an object to which said outer major surface of said first layer of adhesive is adhered, said support layer includes means releasably attaching said parts together to provide said means for affording separation of said first and second parts of said support layer and thereby separation of rigid objects to which said anchor portions are bonded by said means for bonding with said tab portion therebetween to afford access to said tab portion and release of adhesive engagement of said first layer of adhesive from one of said rigid objects by stretching said attachment strip, said means releasably attaching said parts together to provide said means for affording separation of said first and second parts of said support layer comprising a generally J-shaped lip along the edge of each of said parts with said lips being engaged with each other to provide said means for releasably attaching said parts together.

9. A tape laminate according to claim 1 wherein said attachment strip comprises a layer of pressure sensitive adhesive defining said outer major surface, and a layer of stretchable polymeric material having a major surface to which said layer of pressure sensitive adhesive is adhered.

10. A tape laminate according to claim 1 wherein said attachment strip comprises a first layer of stretchable polymeric material having opposite major surfaces with one major surface of the first layer of stretchable polymeric material bonded to said first layer of pressure sensitive adhesive, a layer of polymeric foam having opposite major surfaces with one major surface of said layer of foam bonded on the surface of said first layer of polymeric material opposite said first layer of pressure sensitive adhesive, and a second layer of polymeric material having opposite major surfaces with one of the major surfaces of said second layer of polymeric material adhered to the major surface of said layer of foam opposite said first layer of polymeric material.

11. A tape laminate according to claim 1 wherein said first layer of pressure sensitive adhesive defines both said inner and outer major surfaces of said attachment strip.

12. A tape laminate according to claim 11 wherein said tab portion is on said first layer of pressure sensitive.

13. A tape laminate according to claim 11 wherein said support layer is of stretchable material and said tab portion is on said first part.

14. A tape laminate according to claim 1 wherein said means for bonding further comprises:

a second attachment strip having opposite ends and inner and outer opposite major surfaces extending between said ends, said second attachment strip comprising a first layer of adhesive defining at least a portion of the outer major surface of said second attachment strip, and said inner major surface of said second attachment strip being bonded to said anchor portion on said second part; and means including a second tab portion for affording stretching of said second attaching strip by pulling on said second tab portion to release adhesive engagement of said second layer of adhesive from an object to which said outer major surface of said second layer of adhesive is adhered so that after the tape laminate has attached two objects together with the adhesive on the outer major surface of each of said attachment strips adhered to a different one of the objects, and the first and second parts of the support layer have been separated, the attachment strips can both be stretched by manually engaging said tab portions to separate the attachment strips from the objects to which they were adhered.

15. An object adapted to be releasably adhered to a vertical surface, said object including a support layer having opposite major surfaces, first and second parts, and an anchor portion of one of said major surfaces on said second part, said first part being attached to or incorporated in said object, and said support layer being folded between said first and second parts to position said anchor portion facing away from said object generally parallel to the portions of said major surfaces on said first part; and an attachment strip having opposite ends, inner and outer opposite major surfaces extending between said ends with a portion of said outer major surface being defined by pressure sensitive adhesive and said inner major surface being bonded to said anchor portion, and a manually engageable tab portion at one end, said attachment strip being stretchable by being pulled at said tab portion to release adhesive engagement of said outer major surface of said attachment strip from an object to which said outer major surface of the attachment strip is adhered, said support layer being adapted to be torn along said fold to afford separation of said first and second parts of said support layer and separation of said object from a surface to which said object is bonded by said attachment strip with said tab portion therebetween to afford access to said tab portion and thereby separation of said attachment strip from that surface by stretching said attachment strip.

16. An object adapted to be releasably adhered to a vertical surface, said object including a support layer having opposite major surfaces, first and second parts, and an anchor portion of one of said major surfaces on said second part, said first part being attached to or incorporated in said object, and said parts of said support layer being generally coplanar to position said anchor portion facing away from said object generally parallel to the portions of said major surfaces on said first part; and an attachment strip having opposite ends, inner and outer opposite major surfaces extending between said ends with a portion of said outer major surface being defined by pressure sensitive adhesive and said inner major surface being bonded to said anchor portion, and a manually engageable tab portion at one end, said attachment strip being stretchable by being pulled at said tab portion to release adhesive engagement of said outer major surface of said attachment strip from an object to which said outer major surface of the attachment strip is adhered, said support layer being perforated to define certain sides of said second part with an attached side of said second part being joined to said first part, and said support layer being adapted to be broken along said perforations and manually torn between said parts to provide separation of said first and second parts of said support layer and separation of said object from a surface to which said object is bonded by said attachment strip with said tab portion therebetween to afford access to said tab portion and thereby separation of said attachment strip from that surface by stretching said attachment strip.

17. An object adapted to be releasably adhered to a vertical surface, said object including a support layer having opposite major surfaces, first and second parts, and an anchor portion of one of said major surfaces on said second part, said first part being attached to or incorporated in said object, and said parts of said support layer being coplanar to position said anchor portion facing away from said object generally parallel to the portions of said major surfaces on said first part; and an attachment strip having opposite ends, inner and outer opposite major surfaces extending between said ends with a portion of said outer major surface being defined by pressure sensitive adhesive and said inner major surface being bonded to said anchor portion, and a manually engageable tab portion at one end, said attachment strip being stretchable by being pulled at said tab portion to release adhesive engagement of said outer major surface of said attachment strip from an object to which said outer major surface of the attachment strip is adhered, said support layer being perforated to define certain sides of said second part with an attached side of said second part being joined to said first part, and said support layer being adapted to be broken along said perforations and bent between said parts to provide separation of said first and second parts of said support layer and separation of said object from a surface to which said object is bonded by said attachment strip with said tab portion therebetween to afford access to said tab portion and thereby separation of said attachment strip from that surface by stretching said attachment strip.

18. An object according to claim 15 wherein said attachment strip comprises a layer of pressure sensitive adhesive defining said outer major surface, and a layer of stretchable polymeric material having a major surface to which said layer of pressure sensitive adhesive is adhered.

19. An object according to claim 15 wherein said attachment strip comprises a layer of pressure sensitive adhesive defining said outer major surface, a first layer of stretchable polymeric material having opposite major surfaces with one major surface of the first layer of stretchable polymeric material bonded to said layer of pressure sensitive adhesive, a layer of polymeric foam having opposite major surfaces with one major surface of said layer of foam bonded on the surface of said first layer of polymeric material opposite said layer of pressure sensitive adhesive, and a second layer of polymeric material having opposite major surfaces with one of the major surfaces of said second layer of polymeric material adhered to the major surface of said layer of foam opposite said first layer of polymeric material.

20. An object according to claim 15 wherein said attachment strip comprises a layer of pressure sensitive adhesive defining said inner and outer major surfaces.

21. In combination an object having a rear surface and a tape laminate said tape laminate comprising:

a support layer having opposite major surfaces, first and second parts, and two anchor portions of one of said major surfaces with each of said anchor portions being on a different one of said parts, said support layer is being folded between said first and second parts to position said anchor portions on opposite sides of said support layer and in generally parallel relationship;

means for bonding the anchor portion on said first part to the rear surface of said object; and a first attachment strip having opposite ends, inner and outer opposite major surfaces extending between said ends with a portion of said outer major surface being defined by pressure sensitive adhesive and said inner major surface being bonded to the anchor portion on said second part, and a manually engageable tab portion at one end, said first attachment strip being stretchable by being pulled at said tab portion to release adhesive engagement of said outer major surface of said first attachment strip from a surface to which said outer major surface of the first attachment strip is adhered, and said support layer being adapted to be torn along said fold to provide separation of said first and second parts of said support layer and separation of said object from a surface to which said object and tape laminate are bonded by said first attachment strip with said tab portion therebetween to afford access to said tab portion and thereby separation of said first attachment strip from said surface by stretching said first attachment strip.

22. In combination an object having a rear surface and a tape laminate, said tape laminate comprising:

a support layer having opposite major surfaces, first and second parts, and two anchor portions of said major surfaces with each of said anchor portions being on a different one of said parts and on a different one of said major surfaces, said support layer being generally planar to thereby position said anchor portions on opposite sides of said support layer and in generally parallel relationship;

means for bonding the anchor portion on said first part to the rear surface of said object; and a first attachment strip having opposite ends, inner and outer opposite major surfaces extending between said ends with a portion of said outer major surface being defined by pressure sensitive adhesive and said inner major surface being bonded to the anchor portion on said second part, and a manually engageable tab portion at one end, said first attachment strip being stretchable by being pulled at said tab portion to release adhesive engagement of said outer major surface of said first attachment strip from a surface to which said outer major surface of the first attachment strip is adhered, said support layer being manually tearable between said parts to provide separation of said first and second parts of said support layer and separation of said object from a surface to which said object and tape laminate are bonded by said first attachment strip with said tab portion therebetween to afford access to said tab portion and thereby separation of said first attachment strip from said surface by stretching said first attachment strip.

23. In combination, an object having a rear surface and a tape laminate, said tape laminate comprising:

a support layer having opposite major surfaces, first and second parts, and two anchor portions of one of said major surfaces with each of said anchor portions being on a different one of said parts, said support layer being folded between said first and second parts to position said anchor portions on opposite sides of said support layer and in generally parallel relationship;

means for bonding the anchor portion on said first part to the rear surface of said object; and a first attachment strip having opposite ends, inner and outer opposite major surfaces extending between said ends with a portion of said outer major surface being defined by pressure sensitive adhesive and said inner major surface being bonded to the anchor portion on said second part, and a manually engageable tab portion at one end, said first attachment strip being stretchable by being pulled at said tab portion to release adhesive engagement of said outer major surface of said first attachment strip from a surface to which said outer major surface of the first attachment strip is adhered, said fold affording pivotal movement of said first and second parts away from each other to provide separation of said first and second parts of said support layer and separation of said object from a surface to which said object and tape laminate are bonded by said first attachment strip with said tab portion therebetween to afford access to said tab portion and thereby separation of said first attachment strip from said surface by stretching said first attachment strip.

24. A combination according to claim 23 wherein said support layer is of polymeric material and includes means between said parts affording ease of pivotal movement of said first and second parts relative to each other.

25. A combination according to claim 23 wherein said support layer is a hinge, and said parts each have an edge portion mounted on a hinge pin included in the hinge for pivotal movement relative to each other.

26. A combination according to claim 23 wherein said first attachment strip comprises a layer of pressure sensitive adhesive defining said outer major surface, and a layer of polymeric material having a major surface to which said layer of pressure sensitive adhesive is adhered.

27. A combination according to claim 23 wherein said first attachment strip comprises a layer of pressure sensitive adhesive defining said outer major surface, a first layer of stretchable polymeric material having opposite major surfaces with one major surface of the first layer of stretchable polymeric material bonded to said layer of pressure sensitive adhesive, a layer of polymeric foam having opposite major surfaces with one major surface of said layer of foam bonded on the surface of said first layer of polymeric material opposite said layer of pressure sensitive adhesive, and a second layer of polymeric material having opposite major surfaces with one of the major surfaces of said second layer of polymeric material adhered to the major surface of said layer of foam opposite said first layer of polymeric material.

28. A combination according to claim 23 wherein said first attachment strip comprises a layer of pressure sensitive adhesive defining both said inner and outer major surfaces of the first attachment strip.

29. A combination according to claim 23 wherein said means for bonding comprises a second attachment strip, said second attachment strip having opposite ends, inner and outer opposite major surfaces extending between said ends with a portion of said outer major surface being defined by pressure sensitive adhesive and said inner major surface being bonded to said anchor surface on said first part, and a manually engageable tab portion at one end, said second attachment strip being stretchable by being pulled at said tab portion to release adhesive engagement of said outer major surface to the rear surface of the object, so that after the tape laminate has attached the object to a surface and the first and second parts of the support layer have been separated, the attachment strips can both be stretched by manually engaging said tab portions to separate the attachment strips from the object and surface to which they were adhered.

* * * * *